(No Model.)
J. D. HALL.
DEVICE FOR WELDING STEEL CALKS TO HORSESHOES.
No. 293,866. Patented Feb. 19, 1884.
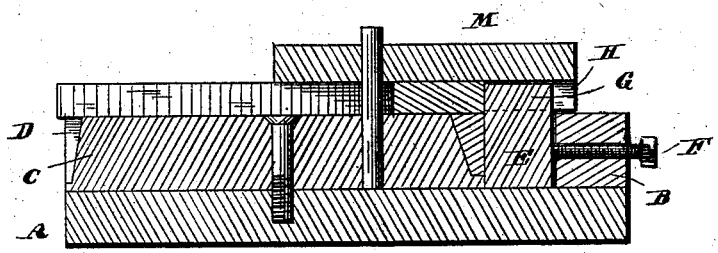
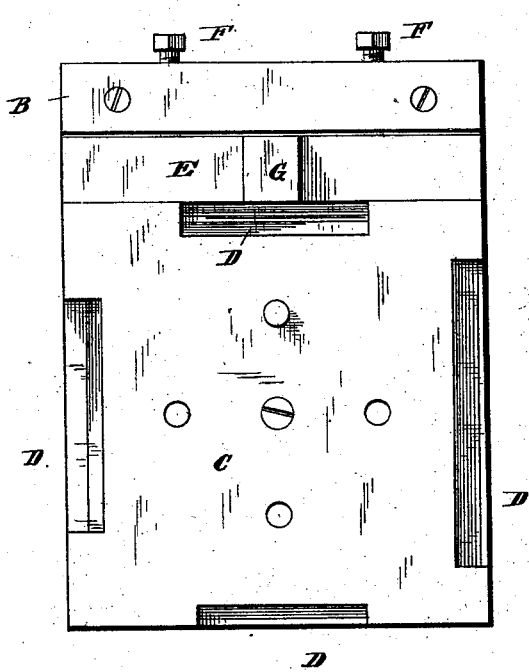
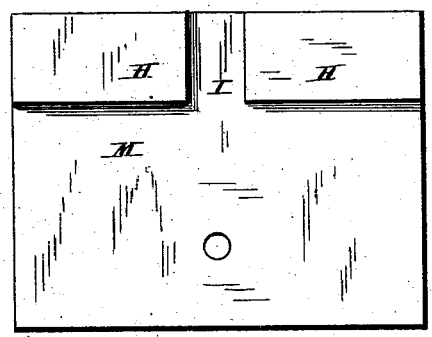
WITNESSES
Chas. D. Davis
E. L. Yewell.
INVENTOR
J. D. Hall
By C. M. Alexander
Attorney

UNITED STATES PATENT OFFICE.

JOHN D. HALL, OF ORRVILLE, OHIO.

DEVICE FOR WELDING STEEL CALKS TO HORSESHOES.

SPECIFICATION forming part of Letters Patent No. 293,866, dated February 19, 1884.

Application filed September 4, 1883. (No model.)

*To all whom it may concern:*

Be it known that I, JOHN D. HALL, a citizen of the United States, residing at Orrville, in the county of Wayne and State of Ohio, have invented certain new and useful Improvements in Devices for Welding Steel Calks to Horseshoes, of which the following is a specification, reference being had therein to the accompanying drawings.

This invention relates to certain improvements in devices for welding steel calks to horseshoes; and it has for its object to provide a system of removable and adjustable die-plates secured to a bed-plate, and adapted to operate together to weld the calk to the shoe, as more fully hereinafter specified.

The above-mentioned object I attain by the means illustrated in the accompanying drawings, in which—

Figure 1 represents a longitudinal vertical sectional view of my improved device; Fig. 2, a top view with the upper die-plate removed, and Fig. 3 a bottom view of the upper die-plate detached.

The letter A indicates the bed-plate of the device, which is constructed of metal, and has a flange, B, at one end. To the said bed-plate is secured or swiveled a movable die-plate, C, having at its edges a series of dies, D, of different sizes, for the purpose more fully hereinafter specified.

The letter E indicates a die, which is removable, and when in position is clamped against one of the edges of the swiveled die-plates before mentioned by means of set-screws F. The said die has an abutment, G, on its upper surface, which serves as a guide in adjusting the horseshoe in the device.

The letter M indicates a removable die-plate, which on its under side, at one edge, is provided with a flange, H, which has a recess, I, which sets over the abutment on the detachable die before mentioned.

In operating my invention the horseshoe is set with the toe against the abutment on the detachable die E, and the calk is placed in the movable die C, so as to come directly under the toe of the shoe. The shoe and calk should both be heated to a proper temperature before being placed in position. The upper die-plate being properly applied, the whole is placed in a suitable press and pressure applied so as to weld the calk to the shoe. The top die-plate is provided with a series of apertures, K, by means of which it may be fastened to the movable die-plate, the said top plate being set over a pin, I, as indicated in the drawings.

Having thus described my invention, what I claim, and desire to secure by Letters Patent, is—

A device for welding steel calks to horseshoes, the same consisting of a bed-plate having a flange and set-screws at one end, a swiveled die-plate, and a removable die provided with an abutment serving as a guide for the shoe, the set-screws adapted to hold the die in position, and the upper die-plate, all constructed and arranged to operate substantially as specified.

In testimony whereof I affix my signature in presence of two witnesses.

JNO. D. HALL.

Witnesses:
 RICHARD BELL,
 ALLEN CARNES.